(12) United States Patent
Nago

(10) Patent No.: US 9,564,685 B2
(45) Date of Patent: Feb. 7, 2017

(54) ANTENNA AND COMMUNICATION APPARATUS

(71) Applicant: CANON KABUSHIKI KAISHA, Tokyo (JP)

(72) Inventor: Hidetada Nago, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 14/290,766

(22) Filed: May 29, 2014

(65) Prior Publication Data

US 2014/0375524 A1 Dec. 25, 2014

(30) Foreign Application Priority Data

Jun. 25, 2013 (JP) .................................. 2013-133094

(51) Int. Cl.
*H01Q 1/36* (2006.01)
*H01Q 7/00* (2006.01)
(Continued)

(52) U.S. Cl.
CPC .................. *H01Q 7/00* (2013.01); *H01Q 1/36* (2013.01); *H01Q 1/38* (2013.01); *H04B 5/0037* (2013.01); *H04B 5/0093* (2013.01)

(58) Field of Classification Search
CPC ..... H04B 5/0037; H04B 5/0093; H01F 38/14; H01F 2027/2857; H01F 27/2871; H02J 17/00
(Continued)

(56) References Cited

U.S. PATENT DOCUMENTS 6,078,609 A 6/2000 Nago
8,686,916 B2 4/2014 Yukimasa et al.
(Continued)

FOREIGN PATENT DOCUMENTS

JP 10-145267 A 5/1998
JP 2001-266101 A 9/2001
(Continued)

OTHER PUBLICATIONS

Ng et al. ("High-Q Flexible Spiral Inductive Coils" 2010 Electromagnetic Compatibility Symposium—Melbourne (EMC Melbourne), Sep. 8-10, 2010 p. 1-4).*
(Continued)

*Primary Examiner* — Dameon E Levi
*Assistant Examiner* — Ricardo Magallanes
(74) *Attorney, Agent, or Firm* — Fitzpatrick, Cella, Harper & Scinto

(57) ABSTRACT

The present invention provides an antenna in which first and second conductors each having a first width are spirally arranged on first and second planes, respectively, such that a conductor-to-conductor distance is equal to a second width, and an inter ends of spirals of the first and second conductors are connected with a conductor. In this antenna, the direction in which the spiral of the first conductor runs from its outer end to its inter end and the direction in which the spiral of the second conductor runs from its inter end to its outer end correspond to each other, the first width is greater than or equal to the second width, and the first and second conductors are alternately arranged in at least a portion thereof as viewed in a radius direction from an axis of the spiral.

7 Claims, 7 Drawing Sheets

(51) Int. Cl.
*H01Q 1/38* (2006.01)
*H04B 5/00* (2006.01)

(58) Field of Classification Search
USPC .......................................... 307/104; 343/895
See application file for complete search history.

(56) References Cited

U.S. PATENT DOCUMENTS

| | | | |
|---|---|---|---|
| 2007/0095913 A1* | 5/2007 | Takahashi | G06K 7/10336 235/451 |
| 2007/0164867 A1 | 7/2007 | Kawai | |
| 2010/0165964 A1 | 7/2010 | Nago | |
| 2010/0189057 A1 | 7/2010 | Nago | |
| 2011/0198940 A1 | 8/2011 | Urano | |

FOREIGN PATENT DOCUMENTS

| | | |
|---|---|---|
| JP | 2002-157560 A | 5/2002 |
| JP | 2005-266963 A | 9/2005 |
| JP | 2011-86890 A | 4/2011 |
| JP | 2012-120410 A | 6/2012 |

OTHER PUBLICATIONS

Imura, Takehiro, "Research on Wireless Power Transfer Using Electromagnetic Resonant Coupling", Doctor's Thesis of Tokyo University, Electrical Engineering Department, 2010.

* cited by examiner

CONVENTIONAL EXAMPLE 1

EXAMPLE 1-1 OF ANTENNA ACCORDING TO EMBODIMENT

EXAMPLE 1-2 OF ANTENNA ACCORDING TO EMBODIMENT

CONVENTIONAL EXAMPLE 2

EXAMPLE 2-1 OF ANTENNA ACCORDING TO EMBODIMENT

EXAMPLE 2-2 OF ANTENNA ACCORDING TO EMBODIMENT

FIG. 5

13.56MHz  THE VALUE WITHIN PARENTHESES IS A Q FACTOR

|  | WIRE WIDTH 2.0mm • WIRE-TO-WIRE GAP 2.0mm | WIRE WIDTH 2.5mm • WIRE-TO-WIRE GAP 2.5mm |
|---|---|---|
| 5 TURNS ON ONE SIDE | RESISTANCE: 0.10Ω<br>L: 0.83uH(707) | RESISTANCE: 0.07Ω<br>L: 0.56uH(681) |
| 5 TURNS ON EACH SURFACE (FACING ARRANGEMENT) | RESISTANCE: 3.10Ω<br>L: 4.22uH(116) | RESISTANCE: 1.71Ω<br>L: 2.20uH(110) |
| 5 TURNS ON FRONT SURFACE AND 4 TURNS ON BACK SURFACE (FIG. 1) | RESISTANCE: 1.25Ω<br>L: 2.99uH(204) | RESISTANCE: 0.47Ω<br>L: 1.67uH(303) |
| 5 TURNS ON EACH SURFACE (NON-FACING ARRANGEMENT, FIG. 3) | RESISTANCE: 2.28Ω<br>L: 3.81uH(142) | RESISTANCE: 0.67Ω<br>L: 1.99uH(253) |

FIG. 6

13.56MHz    THE VALUE WITHIN PARENTHESES IS A Q FACTOR

| | 5 TURNS ON FRONT SURFACE AND 4 TURNS ON BACK SURFACE (FIG. 1) | 5 TURNS ON EACH SURFACE (NON-FACING ARRANGEMENT, FIG. 3) |
|---|---|---|
| WIRE WIDTH 1.5mm · WIRE-TO-WIRE GAP 2.0mm | RESISTANCE: 2.10Ω<br>L: 4.08uH(165) | RESISTANCE: 4.13Ω<br>L: 5.42uH(112) |
| WIRE WIDTH 2.0mm · WIRE-TO-WIRE GAP 2.0mm | RESISTANCE: 1.25Ω<br>L: 2.99uH(204) | RESISTANCE: 3.03Ω<br>L: 3.82uH(107) |
| WIRE WIDTH 2.1mm · WIRE-TO-WIRE GAP 2.0mm | RESISTANCE: 1.14Ω<br>L: 2.81uH(210) | RESISTANCE: 2.69Ω<br>L: 3.55uH(112) |
| WIRE WIDTH 2.2mm · WIRE-TO-WIRE GAP 2.0mm | RESISTANCE: 1.03Ω<br>L: 2.63uH(217) | RESISTANCE: 2.41Ω<br>L: 3.30uH(116) |
| WIRE WIDTH 2.3mm · WIRE-TO-WIRE GAP 2.0mm | RESISTANCE: 0.92Ω<br>L: 2.46uH(228) | RESISTANCE: 2.12Ω<br>L: 3.06uH(123) |
| WIRE WIDTH 2.4mm · WIRE-TO-WIRE GAP 2.0mm | RESISTANCE: 0.86Ω<br>L: 2.30uH(228) | RESISTANCE: 1.98Ω<br>L: 2.84uH(122) |
| WIRE WIDTH 2.5mm · WIRE-TO-WIRE GAP 2.0mm | RESISTANCE: 0.78Ω<br>L: 2.15uH(235) | RESISTANCE: 1.79Ω<br>L: 2.63uH(125) |
| WIRE WIDTH 2.6mm · WIRE-TO-WIRE GAP 2.0mm | RESISTANCE: 0.72Ω<br>L: 2.01uH(238) | RESISTANCE: 1.44Ω<br>L: 2.26uH(133) |
| WIRE WIDTH 2.7mm · WIRE-TO-WIRE GAP 2.0mm | RESISTANCE: 0.66Ω<br>L: 1.87uH(241) | RESISTANCE: 1.34Ω<br>L: 2.14uH(136) |
| WIRE WIDTH 2.8mm · WIRE-TO-WIRE GAP 2.0mm | RESISTANCE: 0.60Ω<br>L: 1.74uH(247) | RESISTANCE: 1.25Ω<br>L: 2.03uH(138) |
| WIRE WIDTH 2.9mm · WIRE-TO-WIRE GAP 2.0mm | RESISTANCE: 0.60Ω<br>L: 1.62uH(230) | RESISTANCE: 1.18Ω<br>L: 1.92uH(139) |

US 9,564,685 B2

ANTENNA AND COMMUNICATION APPARATUS

BACKGROUND OF THE INVENTION

Field of the Invention

The present invention relates to an antenna for transferring power.

Description of the Related Art

With wireless power transfer, in order to achieve an improvement in transfer efficiency or an extension of the transfer distance, the idea of reducing the resistance of an antenna while increasing the inductance value of the antenna has been proposed. The inductance value of the antenna can be increased by increasing the size of the antenna, or increasing the number of turns of its coil. However, the antenna size is limited by a wireless communication apparatus on which the antenna is mounted. There is also a limit to increasing the number of turns of the coil due to the size of the wireless communication apparatus. If the number of turns is increased in a small space, conductors constituting the antenna are closely located to each other, which may increase the resistance due to the stray capacitance or proximity effect generated between the conductors.

Meanwhile, the idea of forming a coil on a multi-layer substrate in which a plurality of substrates are stacked has been proposed. Japanese Patent Laid-Open No. 10-145267 discloses a technique for increasing the inductance value by constituting an RFID antenna with a multi-layer structure. However, according to Japanese Patent Laid-Open No. 10-145267, a spiral conductor is arranged on a front surface and a back surface of a substrate such that the conductor formed on the front surface and the conductor formed on the back surface face each other. Accordingly, the resistance component increases due to the stray capacitance or proximity effect generated between the conductor formed on the front surface and the conductor formed on the back surface.

Here, Q factor of the coil in the antenna is given by the following equation:

$$Q = 2\pi f L / r \quad (1),$$

where L represents the inductance of the antenna, and r represents the internal resistance of the antenna. Japanese Patent Laid-Open No. 10-145267 relates to an antenna designed for RFID. With RFID antennas, because Q is set to a low value, it is important to increase the internal resistance according to an increase in the inductance. With wireless power transfer, on the other hand, the internal resistance affects the transfer efficiency, and it is therefore important to minimize the internal resistance while increasing the inductance value.

Meanwhile, Japanese Patent Laid-Open Nos. 2012-120410 and 2011-086890 disclose a multi-layer structure in which a conductor pattern on the front surface and a conductor pattern on the back surface are arranged such that they are offset from each other. According to the techniques disclosed in Japanese Patent Laid-Open Nos. 2012-120410 and 2011-086890, in order to suppress the stray capacitance generated when the front surface pattern and the back surface pattern are formed to be aligned, the conductor-to-conductor gap is set to be greater than the conductor width so as to reduce the stray capacitance.

The methods of Japanese Patent Laid-Open Nos. 2012-120410 and 2011-086890, however, are problematic in that there is a limit to miniaturization of the antennas because the conductor arranged on a first layer and the conductor arranged on a second layer need to be spaced apart from each other by an appropriate distance in order to reduce the stray capacitance between a plurality of layers.

The present invention has been conceived to address the problems described above, and provides a miniaturized antenna whose resistance is reduced while its inductance value is increased.

SUMMARY OF THE INVENTION

According to one aspect of the present invention, there is provided an antenna in which a first conductor having a first width is spirally arranged on a first plane such that a conductor-to-conductor distance is equal to a second width, and a second conductor having the first width is spirally arranged on a second plane such that a conductor-to-conductor distance is equal to the second width, and an inter end of a spiral of the first conductor and an inter end of a spiral of the second conductor are connected with a conductor, wherein a direction in which the spiral of the first conductor runs from its outer end to its inter end and a direction in which the spiral of the second conductor runs from its inter end to its outer end correspond to each other, as viewed from one direction, the first width is equal to or greater than the second width, and the first conductor and the second conductor are alternately arranged in at least a portion thereof as viewed in a radius direction from an axis of the spiral of the first conductor or the spiral of the second conductor.

Further features of the present invention will become apparent from the following description of exemplary embodiments with reference to the attached drawings.

BRIEF DESCRIPTION OF THE DRAWINGS

FIG. 5 is a table showing inductance values and resistance characteristics for each antenna configuration.

FIG. 6 is a table showing inductance values and resistance characteristics for wire width and wire-to-wire gap.

DESCRIPTION OF THE EMBODIMENTS

Figure 1:
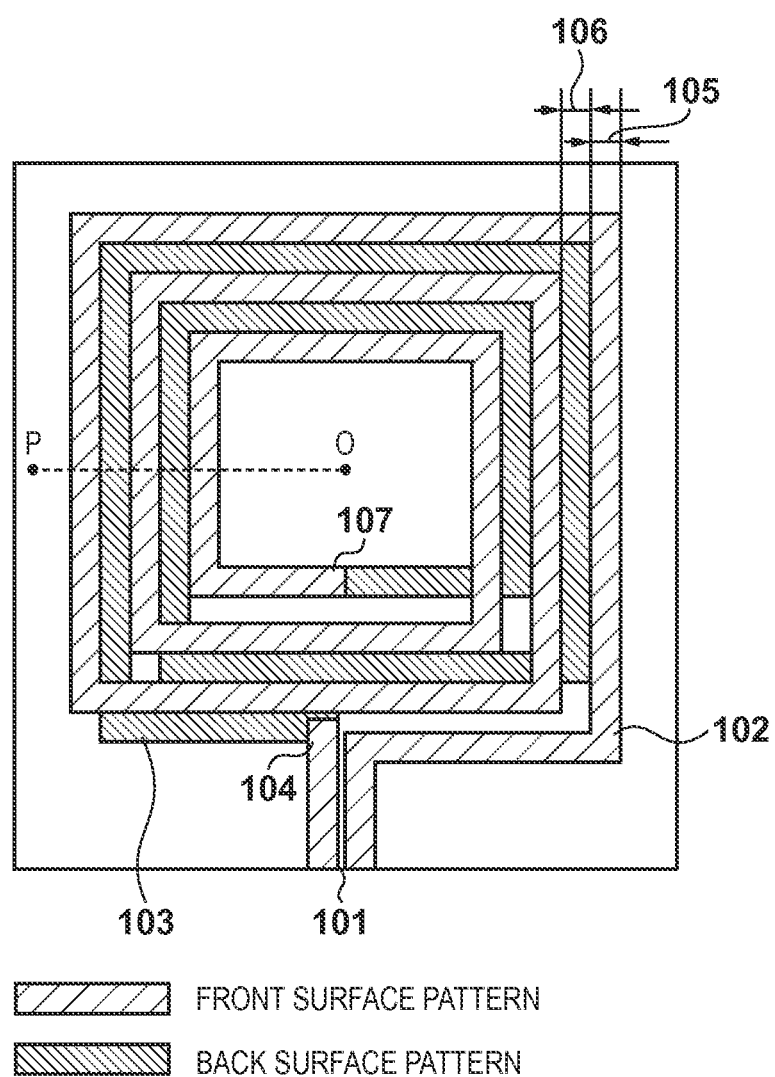
FIG. 1 is a schematic diagram showing an example of a configuration of a first antenna.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the following description, configurations of an antenna will be mainly described. The antenna may be an antenna externally attached to a communication apparatus or an antenna built in a communication apparatus. The communication apparatus can transfer power with the use of the antenna. In other words, the communication apparatus may be a power supply apparatus that supplies electric power with the use of the antenna, a power receiving apparatus that receives electric power with the use of the antenna, or a communication apparatus that performs communication with the use of, for example, received electric power.

Overview

An antenna according to the present embodiment has a multi-layer structure, as with the antenna disclosed in Japanese Patent Laid-Open No. 2011-086890, in which a first conductor is spirally arranged on a first plane (for example, the front surface of a substrate), and a second conductor is spirally arranged on a second plane (for example, the back surface of the substrate) that is parallel to the first plane. Then, the inter end of the spiral of the first conductor and the inter end of the spiral of the second conductor are connected with a conductor penetrating the substrate. In other words, the first conductor and the second conductor are formed as a single continuous conductor extending from the outer end of the spiral of the first conductor to the outer end of the spiral of the second conductor.

At this time, the first conductor and the second conductor are formed such that a direction in which the spiral of the first conductor runs from the outer end to the inter end and a direction in which the spiral of the second conductor runs from the inter end to the outer end correspond to each other, as viewed from the surface on which the first conductor is formed or the surface on which the second conductor is formed. That is, the first conductor and the second conductor are formed such that the conductors are wound in the same direction and form a single coil. At this time, the first conductor and the second conductor are alternately arranged in at least a portion thereof, as viewed from in the radius direction from the axis of the spiral, as in the antenna disclosed in Japanese Patent Laid-Open No. 2011-086890. That is, the first conductor and the second conductor are configured such that if it is assumed that the spiral of the first conductor and the spiral of the second conductor are expressed by a line passing through the center of each conductor having a fixed width, the lines do not face each other in at least a portion thereof. As a result, in at least the portion thereof, a part of the first conductor faces the gap between conductors in the spiral of the second conductor. Likewise, a part of the second conductor faces the gap between conductors in the spiral of the first conductor.

With the antenna according to the present embodiment, the first conductor and the second conductor have a same first width, a spiral of the first conductor and a spiral of the second conductor are formed such that the distance between conductors in the spirals is equal to a second width, and the first width is set to be greater than or equal to the second width. That is, the conductor width is greater than the conductor-to-conductor gap. Accordingly, although the first conductor faces the conductor-to-conductor gap in the spiral of the second conductor, but in the outer edge portion thereof, the first conductor faces the second conductor itself.

Configuration Example of Antenna

A specific configuration example of the above antenna will be described below with reference to FIG. 1, FIGS. 2A to 2C, FIG. 3, and FIGS. 4A to 4C. FIGS. 1 and 3 respectively show a first example configuration and a second example configuration of the antenna according to the present embodiment. In the description given below, an antenna pattern is formed on each of a front surface and a back surface of a single substrate, but the present invention is not limited thereto. It is possible to, for example, form an antenna pattern on each of parallel layers (between substrates) in a multi-layer structure substrate in which a plurality of substrates are stacked.

In FIG. 1, reference numeral 101 indicates a feeding point, reference numeral 102 indicates a front surface pattern, reference numeral 103 indicates a back surface pattern, and reference numerals 104 and 107 each indicate a through hole where the front surface pattern 102 and the back surface pattern 103 are joined. Reference numeral 105 indicates a first width, which is the width of the conductor of the front surface pattern 102 and the back surface pattern 103, and reference numeral 106 indicates a second width, which is the wire-to-wire gap (i.e., conductor-to-conductor gap) of the front surface pattern 102 and the back surface pattern 103.

In the antenna shown in FIG. 1, as described above, the front surface pattern 102 is formed by spirally wiring a conductor having the first width 105 such that the conductor-to conductor distance is equal to the second width 106. The front surface pattern 102 is connected to the back surface pattern 103 via the through hole 107 with a conductor. As with the front surface pattern 102, the back surface pattern 103 is formed by spirally wiring a conductor having the first width 105 such that the conductor-to conductor distance is equal to the second width 106. At this time, as shown in FIG. 1, the front surface pattern 102 and the back surface pattern 103 are configured such that the direction in which the spiral of the front surface pattern 102 runs from the outer end to the inter end and the direction in which the spiral of the back surface pattern 103 runs from the inter end to the outer end are both counterclockwise, and these directions correspond to each other, as viewed from one direction (as viewed from the front surface or the back surface) as described above.

Here, the front surface pattern 102 and the back surface pattern 103 are alternately arranged in at least a portion thereof as viewed in the radius direction from the center (axis) of the spiral. For example, the patterns are formed such that the front surface pattern 102 and the back surface pattern 103 do not face each other in an area other than the area where the front surface pattern 102 and the back surface pattern 103 intersect with each other, as viewed from the front surface direction. In order to achieve such a configuration, in FIG. 1, the number of turns on the back surface pattern 103 is less than the number of turns on the front surface pattern 102 by one. With this configuration, the overall size of the antenna can be reduced to fit within the contour of the front surface pattern 102. Note that the conductor width (first width) is greater than or equal to the conductor-to-conductor distance (second width).

Figure 2A:
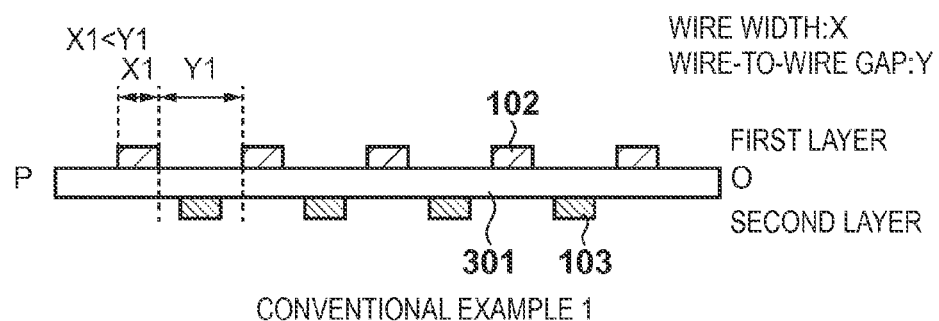
FIGS. 2A to 2C are comparative diagrams between a configuration of a conventional antenna and example configurations of the first antenna.
Figure 2B:
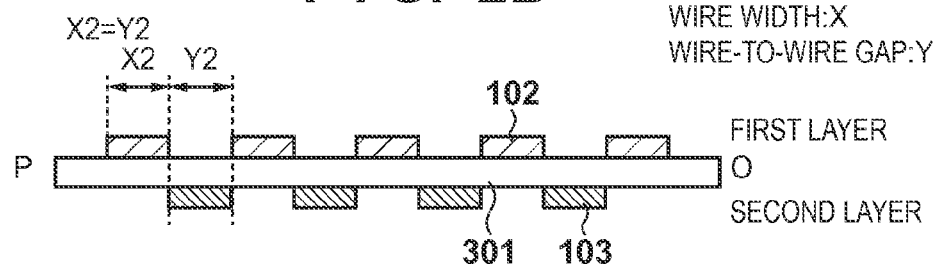
Figure 2C:
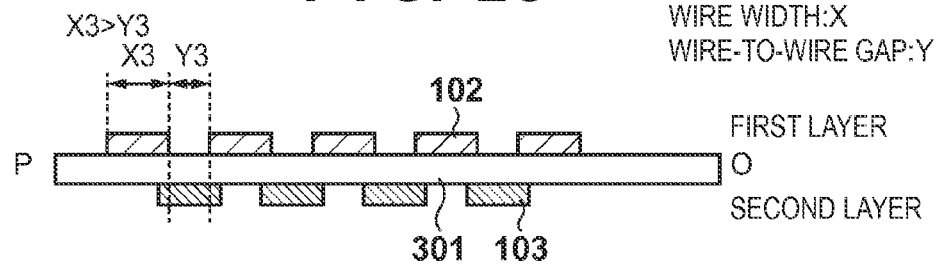
Figure 3:
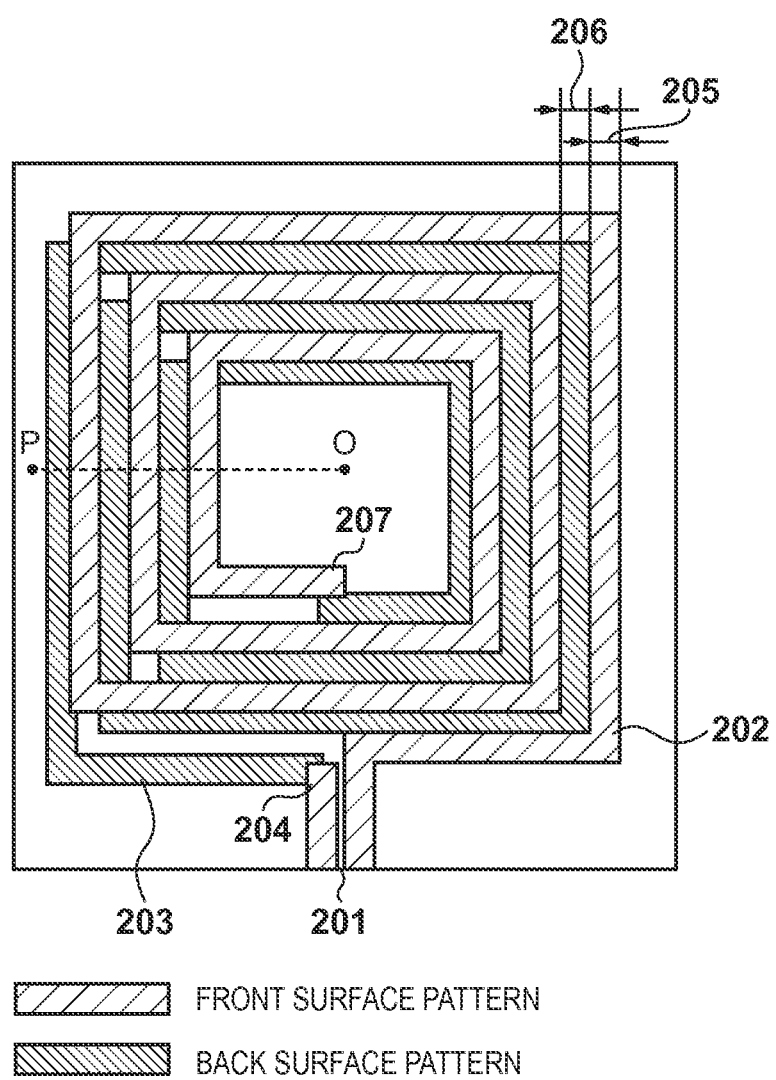
FIG. 3 is a schematic diagram showing an example of a configuration of a second antenna.

FIGS. 2A to 2C show examples of cross-sectional views of antennas having such a configuration as viewed in one radius direction (extending from point O to point P in FIG. 1) from the axis of the spiral. Note that FIGS. 2A to 2C are not accurate cross-sectional views of FIG. 1, and merely illustrate exemplary configurations in which the number of turns on the front surface is 5 and the number of turns on the back surface is 4. FIG. 2A shows a cross-section of a conventional configuration disclosed in Japanese Patent Laid-Open No. 2011-086890, FIG. 2B shows a cross-section of a configuration of the antenna according to the present embodiment in which the first width 105 and the second width 106 are equal, and FIG. 2C shows a cross-section of a configuration of the antenna according to the present embodiment in which the first width 105 is greater than the second width 106. In FIGS. 2A to 2C, reference numeral 301 indicates a substrate serving as a base for the antenna.

The antenna according to the present embodiment is formed, as in the antenna disclosed in Japanese Patent Laid-Open No. 2011-086890, such that an antenna pattern formed on a first layer (front surface) faces a conductor-to-conductor gap on a second layer (back surface). Accordingly, as viewed in the radius direction from the axis of the spiral, conductors are alternately formed on the first layer and the second layer. A primary difference between the antenna according to the conventional example and the antenna according to the present embodiment is that the conductor width (first width) is greater than or equal to the conductor-to-conductor gap (second width). Accordingly, when, for example, the conductor width and the gap width are equal, as shown in FIG. 2B, the position of a conductor on the front surface corresponds to the position of a gap on the back surface as viewed from, for example, the front surface direction. When the conductor width is greater than the gap width, as shown in FIG. 2C, end portions of the conductors on the front and back surfaces face each other. Accordingly, with the antenna according to the present embodiment, the conductor-to-conductor distance can be reduced as compared to the antennas according to the conventional example, and thus the antenna according to the present embodiment can be miniaturized as compared to the antennas according to the conventional example.

A second configuration example of the antenna shown in FIG. 3 can be made in the same manner as the first configuration example of the antenna shown in FIG. 1. In FIG. 3, the front surface pattern and the back surface pattern have the same number of turns, and thus the inductance value can be further increased.

In FIG. 3, as in FIG. 1, reference numeral 201 indicates a feeding point, reference numeral 202 indicates a front surface pattern, reference numeral 203 indicates a back surface pattern, and reference numerals 204 and 207 each indicate a through hole where the front surface pattern 202 and the back surface pattern 203 are joined. As in FIG. 1, reference numeral 205 indicates a first width, which is the width of the conductor of the front surface pattern 202 and the back surface pattern 203, and reference numeral 206 indicates a second width, which is the wire-to-wire gap of the front surface pattern 202 and the back surface pattern 203.

In the antenna shown in FIG. 3 as well, as described above, the front surface pattern 202 is formed by spirally wiring a conductor having the first width 205 such that the conductor-to conductor distance is equal to the second width 206. The front surface pattern 202 is connected to the back surface pattern 203 via the through hole 207 with a conductor. As with the front surface pattern 202, the back surface pattern 203 is formed by spirally wiring a conductor having the first width 205 such that the conductor-to conductor distance is equal to the second width 206. At this time, as shown in FIG. 3, the front surface pattern 202 and the back surface pattern 203 are configured such that the direction in which the spiral of the front surface pattern 202 runs from the outer end to the inter end and the direction in which the spiral of the back surface pattern 203 runs from the inter end to the outer end are both counterclockwise, and these directions correspond to each other, as viewed from one direction (as viewed from the front surface or the back surface) as described above.

As in the example shown in FIG. 1, the front surface pattern 202 and the back surface pattern 203 are also alternately arranged in at least a portion thereof as viewed in the radius direction from the center (axis) of the spiral. For example, the patterns are formed such that the front surface pattern 202 and the back surface pattern 203 do not face each other in an area other than the area where the front surface pattern 202 and the back surface pattern 203 intersect with each other, as viewed from the front surface direction.

Figure 4A:
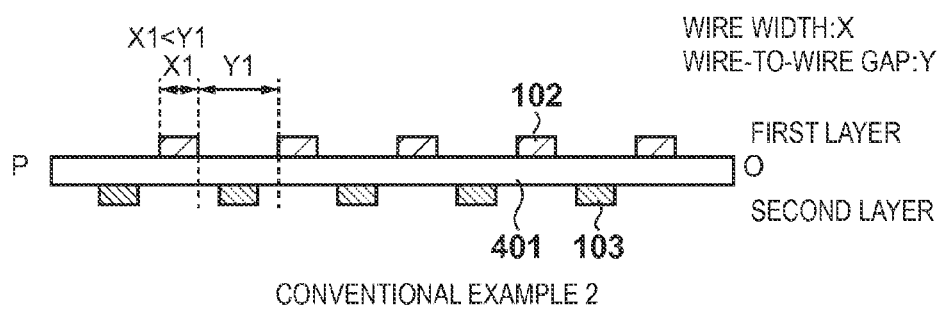
FIGS. 4A to 4C are comparative diagrams between a configuration of a conventional antenna and example configurations of the second antenna.
Figure 4B:
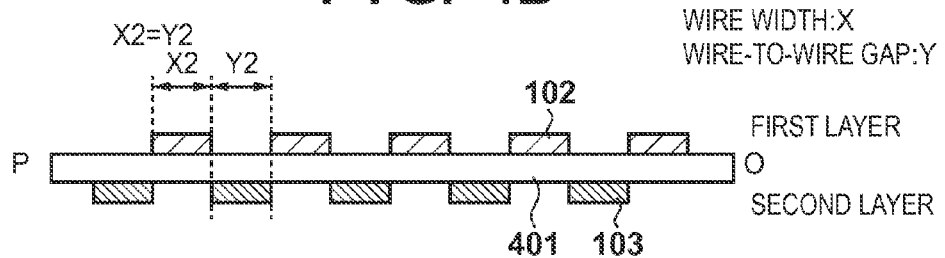
Figure 4C:
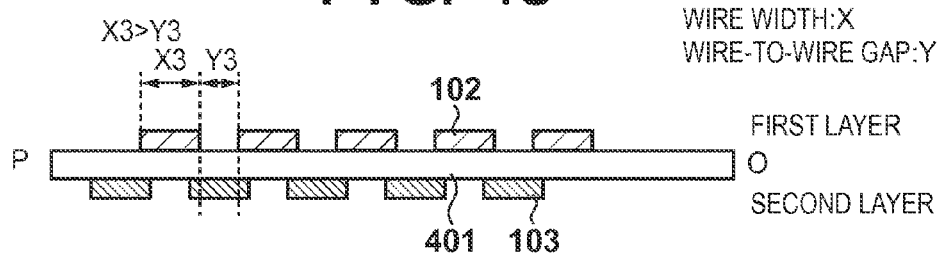

FIGS. 4A to 4C show examples of cross-sectional views of antennas having such a configuration as viewed in one radius direction (extending from point O to point P in FIG. 3) from the axis of the spiral. Note that FIGS. 4A to 4C are not accurate cross-sectional views of FIG. 3, and merely illustrate exemplary configurations in which the number of turns on the front surface and the number of turns on the back surface are both 5. FIG. 4A shows a cross-section of a conventional configuration disclosed in Japanese Patent Laid-Open No. 2011-086890, FIG. 4B shows a cross-section of a configuration of the antenna according to the present embodiment in which the first width 205 and the second width 206 are equal, and FIG. 4C shows a cross-section of a configuration of the antenna according to the present embodiment in which the first width 205 is greater than the second width 206. In FIGS. 4A to 4C, reference numeral 401 indicates a substrate serving as a base for the antenna.

In FIGS. 4A to 4C as well, as in examples shown in FIGS. 2A to 2C, as viewed in the radius direction from the axis of the spiral, conductors are alternately formed on the first layer and the second layer. A primary difference between the antenna according to the conventional example and the antenna according to the present embodiment is that the conductor width (first width) is greater than or equal to the conductor-to-conductor gap (second width). Accordingly, when, for example, the conductor width and the gap width are equal, as shown in FIG. 4B, the position of a conductor on the front surface corresponds to the position of a gap on the back surface as viewed from, for example, the front surface direction. When the conductor width is greater than the gap width, as shown in FIG. 4C, end portions of the conductors on the front and back surfaces face each other. Accordingly, with the antenna according to the present embodiment, the conductor-to-conductor distance can be reduced as compared to the antennas according to the conventional example, and thus the antenna according to the present embodiment can be miniaturized as compared to the antennas according to the conventional example.

Characteristics of Antenna

The characteristics of the antenna according to the present embodiment will be described next. As shown in "Research on Wireless Power Transfer Using Electromagnetic Resonant Coupling" by Takehiro Imura, Doctor's Thesis of Tokyo University, Electrical Engineering Department, 2010, the highest efficiency of an antenna is expressed by the following equation:

$$H=(Z-r)/(Z+r)=(Z-r)2/(Lm\times 2\pi f)2=(Lm\times 2\pi f)2/(Z+r)2 \qquad (2),$$

where H represents efficiency, Z represents characteristic impedance, r represents the resistance of the antenna, Lm represents mutual inductance, and f represents transfer frequency. According to "Research on Wireless Power Transfer Using Electromagnetic Resonant Coupling" by Takehiro Imura, Doctor's Thesis of Tokyo University, Electrical Engineering Department, 2010, mutual inductance, which is the highest efficiency, is given by the following equation:

$$Lm=((Z-r)(Z+r))^{1/2}/2\pi f \qquad (3).$$

The mutual inductance is determined by frequency, characteristic impedance, and internal resistance.

If a power supplying antenna and a power receiving antenna are caused to face each other with a given distance therebetween, the antennas are electromagnetically coupled.

Generally, in the case where antennas facing each other are of the same type, mutual inductance Lm' is expressed by the following equation:

$$Lm' = kL \quad (4),$$

where k represents the coupling factor between the antennas, and L represents the inductance value of the antennas. The coupling factor k is a value that varies according to the distance between the antennas, and is expressed by a value of 0 to 1. The higher the value, the higher the degree of coupling.

When the mutual inductance Lm' obtained from Equation (4) with a given distance is greater than or equal to the mutual inductance of Equation (3), a high transfer efficiency can be ensured. Accordingly, the transfer distance over which power can be transferred while maintaining a high transfer efficiency varies depending on how many times higher the inductance value of the antenna with respect to the mutual inductance Lm determined from Equation (3).

FIG. 5 shows results obtained by analyzing the following antennas: an antenna having a pattern with 5 turns formed only on one surface, an antenna having a front surface pattern with 5 turns and a back surface pattern with 5 turns formed on both surfaces in a facing relationship, an antenna of a type shown in FIG. 1 having 5 turns on the front surface and 4 turns on the back surface, and an antenna of a type shown in FIG. 3 having 5 turns on the front surface and 5 turns on the back surface. In this analysis, each antenna had a square shape with a side length of 5 cm, a conductor thickness of 400 μm, and an operation frequency of 13.56 MHz.

It can be seen from FIG. 5 that the antenna having a front surface pattern with 5 turns and a back surface pattern with 5 turns formed on both surfaces in a facing relationship was configured by simply arranging the same patterns on the front surface and the back surface, but the characteristics thereof was not doubled relative to those of the antenna having a pattern with 5 turns formed only on one surface, and both the inductance value and the resistance increased significantly. This is because, as stated in Japanese Patent Laid-Open No. 2011-086890, the inductance value and the resistance vary due to the stray capacitance generated between the front surface pattern and the back surface pattern and the proximity effect between the conductors. At this time, if the antennas of the same type are arranged so as to face each other, from Equation (2), a highest efficiency of 88% is obtained.

It can also be seen that, on the other hand, when the pattern on the front surface and the pattern on the back surface are offset from each other as in the antennas shown in FIGS. 1 and 3, the inductance value can be increased as compared to that of the antenna having a pattern with 5 turns formed only on one surface, and the resistance can be suppressed as compared to that of the antenna having a front surface pattern with 5 turns and a back surface pattern with 5 turns formed on both surfaces in a facing relationship. At this time, when the antenna of a type shown in FIG. 1 having 5 turns on the front surface and 4 turns on the back surface is used, a highest efficiency of 95% is obtained. When the antenna of a type shown in FIG. 3 having 5 turns on the front surface and 5 turns on the back surface is used, a highest efficiency of 91% is obtained. In this way, the highest transfer efficiency can be improved by reducing the resistance of the antenna.

Next, FIG. 6 shows results obtained by analyzing an antenna of a type shown in FIG. 1 having 5 turns on the front surface and 4 turns on the back surface, and an antenna of a type shown in FIG. 3 having 5 turns on the front surface and 5 turns on the back surface by setting the wire-to-wire gap to 2 mm and changing the wire width (i.e., conductor width) in a range from 2 to 2.9 mm in increments of 0.1 mm. FIG. 6 also shows results obtained by analyzing an antenna of a type shown in FIG. 1 having 5 turns on the front surface and 4 turns on the back surface, and an antenna of a type shown in FIG. 3 having 5 turns on the front surface and 5 turns on the back surface, which correspond to the antenna according to the conventional technique disclosed in Japanese Patent Laid-Open No. 2011-086890, by setting the wire-to-wire gap to 2 mm and the wire width to 1.5 mm (see the top line of the table).

It can be seen from FIG. 6 that the inductance value can be reduced by increasing the wire width and increasing the ratio of the area where the front surface pattern and the back surface pattern face each other, but the resistance decreases accordingly. Therefore, in the case where the primary purpose is to increase transfer efficiency, it can be achieved by increasing the ratio of the area where the front surface pattern and the back surface pattern face each other. At this time, the mutual inductance required by a given transfer frequency is determined by Equation (3), and thus in order to acquire the desired transfer distance, the ratio of the area where the front surface pattern and the back surface pattern face each other is limited in relation to Equation (4).

As described above, with the antenna according to the present embodiment, the conductor width is set to be greater than or equal to the conductor-to-conductor gap, and it is thereby possible to miniaturize the antenna. Also, the ratio of the area where the front surface pattern and the back surface pattern face each other is controlled, and it is thereby possible to control the inductance value and the resistance value according to the purpose of the antenna.

Figure 7A:
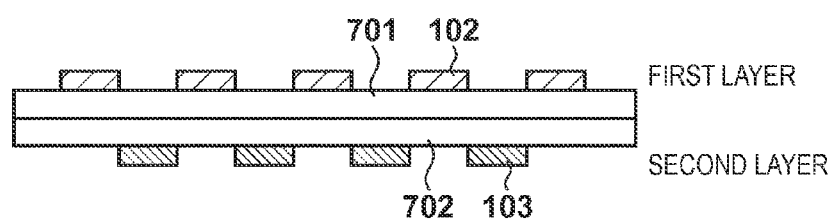
FIGS. 7A and 7B are cross-sectional views showing examples of configurations of antennas in which a first layer and a second layer, each having an antenna pattern formed thereon, are formed on separate substrates.
Figure 7B:
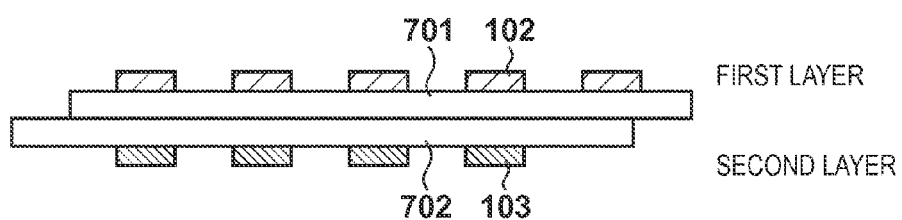

In the embodiment given above, an example was described in which the first layer and the second layer, each having an antenna pattern formed thereon, respectively serve as the front surface and the back surface of a single substrate, but the present invention is not limited thereto. It is possible to form a single antenna by, for example, as shown in FIGS. 7A and 7B, forming a first antenna pattern on a first substrate and a second antenna pattern on a second substrate, and connecting the formed antenna patterns via a through hole by conductors. FIGS. 7A and 7B are cross sectional views showing examples of antenna configurations in which an antenna pattern of a first layer with 5 turns is formed on a first substrate 701 and an antenna pattern of a second layer with 4 turns is formed on a second substrate 702. As shown in FIGS. 7A and 7B, by forming an antenna pattern on the front surface of each of two substrates, and bonding together the substrates such that their back surfaces are coplanar, the same effects as those of the antenna according to the above-described embodiment can be obtained.

Also, the relative position between the first substrate 701 and the second substrate 702 may be variable. It is thereby possible to switch the antenna configuration between, for example, a configuration in which the conductors of the antenna patterns formed on the first layer and the second layer face each other and a configuration in which the conductors do not face each other. That is, the characteristics of the antenna can be set by selecting from the state on the second line and the state on the third or fourth line of the table shown in FIG. 5. Accordingly, in the case where it is necessary to ensure a long transfer distance, the relative position can be changed by changing the position of either one of the first substrate 701 and the second substrate 702 such that the front surface pattern 102 and the back surface pattern 103 face each other, so as to increase the inductance. Likewise, in the case where it is necessary to improve the transfer efficiency, the relative position can be changed by changing the position of either one of the first substrate 701 and the second substrate 702 such that the back surface pattern faces the wire-to-wire gap on the front surface pattern, so as to reduce the resistance. Likewise, in order to change the ratio of the area where the front surface pattern and the back surface pattern face each other, the relative position may be changed by changing the position of either one of the first substrate 701 and the second substrate 702.

FIGS. 7A and 7B show examples in which the number of turns on the front surface pattern is 5, and the number of turns on the back surface pattern is 4, but the same configuration can be used when the front surface pattern and the back surface pattern have the same number of turns.

According to the present invention, it is possible to miniaturize an antenna whose resistance is reduced while its inductance value is increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133094 filed on Jun. 25, 2013, which is hereby incorporated by reference herein in its entirety.

What is claimed is:

1. An antenna in which a first conductor having a first width is spirally arranged on a first plane such that a conductor-to-conductor distance is equal to a second width, and a second conductor having the first width is spirally arranged on a second plane such that a conductor-to-conductor distance is equal to the second width, and an inner end of a spiral of the first conductor and an inner end of a spiral of the second conductor are connected with a conductor,
    wherein a direction in which the spiral of the first conductor runs from its outer end to its inner end and a direction in which the spiral of the second conductor runs from its inner end to its outer end correspond to each other, as viewed from one direction,
    the first width is greater than the second width,
    the first conductor and the second conductor are alternately arranged in at least a portion thereof as viewed in a radius direction from an axis of the spiral of the first conductor or the spiral of the second conductor, and
    the first conductor and the second conductor are arranged such that the first conductor and the second conductor are overlapped at least another portion thereof as viewed in a radius direction from an axis of the spiral of the first conductor or the spiral of the second conductor.

2. The antenna according to claim 1,
wherein the second conductor has the same number of turns as the first conductor, or a number of turns that is less than the number of turns of the first conductor by one.

3. The antenna according to claim 1,
wherein the first plane is a front surface of a substrate on which the antenna is formed, and
the second plane is a back surface of the substrate.

4. The antenna according to claim 1,
wherein the first plane is a front surface of a first substrate,
the second plane is a front surface of a second substrate that is different from the first substrate, and
the antenna is formed by stacking the first substrate and the second substrate such that a back surface of the first substrate and a back surface of the second substrate are coplanar.

5. The antenna according to claim 4,
wherein a relative position between the first substrate and the second substrate is variable.

6. The antenna according to claim 1,
wherein the second plane is parallel to the first plane.

7. A communication apparatus comprising an antenna in which a first conductor having a first width is spirally arranged on a first plane such that a conductor-to-conductor distance is equal to a second width, and a second conductor having the first width is spirally arranged on a second plane such that a conductor-to-conductor distance is equal to the second width, and an inner end of a spiral of the first conductor and an inner end of a spiral of the second conductor are connected with a conductor,
    wherein a direction in which the spiral of the first conductor runs from its outer end to its inner end and a direction in which the spiral of the second conductor runs from its inner end to its outer end correspond to each other, as viewed from one direction,
    the first width is greater than the second width,
    the first conductor and the second conductor are alternately arranged in at least a portion thereof as viewed in a radius direction from an axis of the spiral of the first conductor or the spiral of the second conductor, and
    the first conductor and the second conductor are arranged such that the first conductor and the second conductor are overlapped at least another portion thereof as viewed in a radius direction from an axis of the spiral of the first conductor or the spiral of the second conductor.

* * * * *